United States Patent [19]

Malek

[11] Patent Number: 4,539,793
[45] Date of Patent: Sep. 10, 1985

[54] METHOD OF FORMING A BURSTABLE POUCH

[75] Inventor: Edward J. Malek, Union Grove, Wis.

[73] Assignee: S. C. Johnson & Son, Inc., Racine, Wis.

[21] Appl. No.: 586,452

[22] Filed: Mar. 5, 1984

Related U.S. Application Data

[63] Continuation-in-part of Ser. No. 488,287, Apr. 25, 1984, abandoned.

[51] Int. Cl.³ .............................................. B65B 1/04
[52] U.S. Cl. ..................................... 53/469; 53/479; 53/DIG. 2; 156/182; 156/254; 156/274.4; 156/275.1; 156/308.4; 156/312; 156/344; 206/484; 206/620; 206/630; 206/634; 219/10.41; 219/10.53; 428/43; 428/910; 493/189
[58] Field of Search ............... 156/182, 312, 254, 344, 156/274.4, 275.1, 308.4, 282; 428/43, 910; 219/10.41, 10.53; 493/189; 206/219, 630, 484, 634, 620; 426/122; 222/107; 53/412, 479, 477, DIG. 2, 469

[56] References Cited

U.S. PATENT DOCUMENTS

| | | | |
|---|---|---|---|
| 2,373,285 | 4/1945 | Baer | 493/209 |
| 2,691,613 | 10/1954 | Baer | 219/10.53 |
| 3,468,736 | 9/1969 | Porter | 156/182 |
| 3,505,146 | 4/1970 | Borough | 156/274.4 |
| 3,770,122 | 11/1973 | Thiele | 206/484 |

Primary Examiner—John J. Gallagher

[57] ABSTRACT

An improved method for forming closed burstable pouches having breakable seals. The method includes selection of a laminated polymeric film which has two principal layers—an outer layer which is responsive, and an inner layer which is non-responsive, to a radio-frequency (RF) welding field, the inner layer being of a biaxially-oriented polymeric material such that its cohesive strength in its thickness direction is less than the cohesive strength of the outer layer. The outer layer has a higher melting point than the inner layer. With two sheets of such material placed with their inner surfaces in contact, the breakable seal is formed by applying an RF welding field for a time and at an intensity to heat the outer layers sufficiently to fuse the inner layers by heat transfer from the outer layers without melting the outer layers and without destroying the biaxially-oriented structure of the inner layer.

7 Claims, 6 Drawing Figures

METHOD OF FORMING A BURSTABLE POUCH

RELATED APPLICATION

This application is a continuation-in-part of Ser. No. 488,287, entitled METHOD OF FORMING A BURSTABLE POUCH, which was filed Apr. 25, 1984, now abandoned.

FIELD OF THE INVENTION

This invention relates to burstable pouches and more particularly to methods for forming burstable pouches having breakable seals along one edge.

BACKGROUND OF THE INVENTION

A great variety of flowable products can advantageously be packaged in burstable pouches. Such pouches may contain a variety of liquids or other flowable materials. Examples include ketchup, mustard, salad dressings, certain photographic compositions, air fresheners, insecticides, water, skin lotions, soaps, and hair care products, to name just a few.

Likewise, burstable pouches may be used in different configurations. Most typically, a single pouch is formed having a burstable seal along one edge from which a stored product may be released for consumption or use. In other configurations, a burstable seal divides two chambers until the burstable seal is broken. In some cases a burstable pouch may be sealed within another larger pouch to form inner and outer chambers. In other cases, two adjacent chambers made of the same opposed flexible film sheets are separated by a burstable seal which joins the flexible films between the chambers such that the bursting therof gives one larger chamber.

When two-chambered pouch configuations are used, two chemical reactants may be stored separately in adjacent chambers. Upon bursting of the burstable seal, the contents of the two chambers intermix and/or react to produce some desired composition or effect. For example, separately stored water may thereby be mixed with dehydrated foodstuffs in an adjacent chamber.

In other cases, one chamber of a two-chamber configuration may be empty until it receives the contents of the other chamber upon bursting of the burstable seal. In the receiving chamber the contents will perform some function which was impossible in the first chamber. For example, an air-freshening liquid composition may be stored in a chamber made of impermeable plastic material, and upon breaking of the breakable seal flow into a chamber made of a permeable plastic material through which it may be dispensed over time to the surrounding atmosphere. See PCT Publication No. WO 82/02700.

A burstable pouch may burst by pre-intended breakage of a seal along one edge of the pouch. Such seal can break when the pouch is squeezed, while any remaining edge seals of such pouch are permanent and resist breakage. Many of such pouches are made of plastic films. It is burstable pouches of this type to which this invention is directed.

The prior art discloses a number of methods for forming breakable seals between two plastic films. In some cases, seams made by heat and pressure applied through constant-temperature heat sealing bars or impulse heat sealing are made breakable by the application of less heat and pressure than is normally used in making permanent seals and/or by reducing the width of the area to which the heat and pressure are applied. These methods of making breakable seals will often produce seams which are either too strong to be easily ruptured or too weak to maintain a satisfactory seal during normal handling. Seal inconsistency is a major problem.

The prior art discloses an improvement on such techniques, namely, the use of additional foam layers to form the breakable seal. See PCT Publication No. WO 82/02700. The imposition of foam layers in the formation of breakable seals fails to produce desired or even acceptable consistency of breakable seals. The strength and bursting qualities of such seals remain extremely sensitive to variations in the heat sealing steps, including, for example, the times, temperatures, and pressures involved.

Other methods for making breakable seals involve the use of chemical or mechanical inhibitors between the films to be sealed. A chemical inhibitor can prevent the formation of a permanent seal, giving instead a breakable seal, even though a heat sealing bar is applied for a time and at a temperature sufficient to make a permanent seal in the absence of such inhibitor. Mechanical inhibitors serve the same purpose by interrupting the seal. U.S. Pat. No. 3,074,544, for example, discloses the use of masking means such as porous fibrous webs to weaken heat seals. The quality of such breakable seals tends to vary unacceptably.

A variety of films have been used in standard pouch making and a variety of sealing techniques have been used to join together flexible plastic films into permanent seals. U.S. Pat. No. 3,770,122, for example, refers to the use of conduction, impulse, high frequency (RF) and ultrasonic welding methods, and mentions the use of laminates of various kinds. U.S. Pat. No. 3,770,122 is not at all concerned, however, with the formation of burstable seals.

Prior teachings relative to the formation of burstable pouches have failed to produce highly reliable breakable seals of consistent quality. The use of ultrasonic sealing techniques to seal together two laminated films, in which the contacting layers of the two films have a relatively low melting point and the remote layers have a relatively high melting point, fails to provide desired consistency in the breakable seals. U.S. Pat. No. 3,749,620 describes the use of ultrasonic sealing for this purpose. Such burstable seals, however, are not sufficiently consistent in their quality from package to package to be reliably used in many applications.

One disadvantage of ultrasonic welding in making breakable seals is that, when such ultrasonic seals intersect previously made permanent heat seals, the area of intersection is often weak and may be prone to leak. Furthermore, such ultrasonic seals are of necessity narrow in width and thus prone to be less consistent from pouch to pouch. The problem with ultrasonic sealing is that it tends to be destructive to the films at least to some extent, and this may lead to inconsistency in the seals.

A variety of modifications and adjustments have been made to basic welding methods for plastic films in order to acheive desirable qualities in a burstable pouch. Such methods have produced less than desirable results in pouch making for various applications.

All of the prior methods for making breakable seals for burstable pouches have significant drawbacks. There is a clear need for an improved method of forming closed burstable pouches having breakable seals of high consistency in strength and bursting qualities.

BRIEF DESCRIPTION OF THE INVENTION

The method of this invention involves the use of radio frequency (RF) welding in a unique way and using laminated films of a particular character to achieve highly consistent breakable seals in burstable pouches. The laminated films required for the method of this invention have a layer (the "inner layer") of non-RF-responsive polymeric material which is biaxially oriented, and a layer (the "outer layer") of RF-responsive polymeric material having a melting point above the melting point of the inner layer.

RF welding, of course, applies principally to certain polymeric film materials—polar (i.e., substantially amorphous) film materials, such as Nylon, acrylonitrile copolymer and poly (ethylene) terephthalate, which are responsive to an RF welding field. Certain non-polar film materials (i.e., polymers which are substantially crystalline) commonly used in packaging, such as polypropylene and polyvinyl alcohol, are substantially non-responsive to an RF welding field unless in some way preconditioned, such as by applying an RF-responsive adhesive or the like. Yet, in certain uses such non-responsive materials may be highly desirable. A part of this invention is the recognition that, while certain plastic films are not responsive to RF energy, RF welding techniques in accordance with this invention can be used to great advantage in forming breakable seals for burstable pouches.

The method of this invention includes the selection of a laminated polymeric film having an outer layer which is responsive to an RF welding field and an inner layer which is biaxially oriented and substantially non-responsive to an RF welding field. The inner layer material is selected to have cohesive strength in its thickness direction which is substantially less than the cohesive stength of the outer layer material. This relative weakness of the inner layer in its thickness direction is due to its biaxial orientation. The outer layer material has a melting point higher than the melting point of the inner layer, preferably at least 30 degrees C. higher.

"Biaxially-oriented" films have their polymer chains oriented in planes generally parallel to the surface of the film, generally in cross directions in such planes. (Such orientation of polymer chains is produced by application of external stretching forces to modify the characteristics of the original structure. This, the cohesive strenght of such films in the thickness direction is relatively small compared to the cohesive strength of such material in directions along the film surface. Biaxially-oriented films have generally good cohesive strength in varying directions along the surface of the film, and much less cohesive strength in the thickness directions than in directions along the surface of the film.

This invention is based in part upon the finding that a biaxially-oriented inner layer gives it weakness in its thickness direction which can be preserved using the RF method of this invention. As will be more fully explained hereafter, this provides a great advantage for burstable pouches: When squeezing pressure is applied to a filled pouch having a breakable seal along one edge which was formed using such material and the method of this invention, the inner layer material of the breakable seal will fracture generally along a plane substantially parallel to the surface of the film.

The burstable pouch is made by placing two sheets of such laminated material in overlying relationship with their inner layers in contact and their edges aligned. Thereafter, the sheets are permanently fused together along their aligned edges, except along a first edge where the breakable seal will be formed. The permanent seal is preferably made by heat sealing with a constant-temperature heat bar, an impulse heat sealer, or by ultrasonic welding. The breakable seal may be formed either before or after the other aligned edges are permanently fused one to the other.

The breakable seal is formed by sandwiching the sheets along the first edge between RF welding electrodes and applying an RF field therebetween for a time and at an intensity to heat the RF-responsive outer layers sufficiently to fuse the facing inner layers by heat transfer from such outer layers without melting such outer layers. The pouch is filled with a liquid or other flowable material before the completion of pouch closing, whether pouch closing is completed by formation of the breakable seal or by formation of the last permanent seal. The breakable seals of such pouches are very consistent from pouch to pouch in seal strength and in the squeezing pressure necessary for bursting.

In making this invention it has been found that the RF field intensity and application time can vary within a broad acceptable range without significantly varying the strength and bursting qualities of the breakable seals thus formed. The relatively lower strength of the inner layer in its thickness direction is not destroyed by the RF welding of this invention. Likewise, the separate integrity of each of the two outer layers is not destroyed. These important characteristics are preserved even though the inner layers are well fused together, rather than merely being tacked at their common surface.

While not wanting to be bound by theoretical discussion of this invention, it is believed that the removal of heat by conduction from the RF-excitable outer layers to the RF electrodes aids in maintaining the separate integrity of such outer layers even though the melting point of such outer layer material is not much greater than the melting point of the inner layer material. During RF welding of such laminates, the inner surfaces of the outer layers are believed to be the locations of greatest heat. This heat is transferred not only outwardly to the RF welding electrodes but inwardly to the adjoining inner layers to fuse the inner layers.

Such heat transfer is sufficient to fuse the inner layers while not destroying their vertical structure, that is, while not disturbing the variations in strength in different directions which are inherent in biaxially-oriented film layers. More specifically, the weakness in the thickness direction which is a characteristic of biaxially-oriented films is maintained using the RF welding method as described herein.

It is believed that the preservation of the vertical structure during fusion of the inner layers may be one key to the high consistency of burstable seals which is provided by this invention. The inner layers fuse into a single layer over a wide range of RF energies applied, without weakening the bond thus made (in the case of lower amounts of RF energy) and without destroying either the vertical structure of the fused inner layers or the integrity of the outer layers by excessive melting or deformation (in the case of higher amounts of energy). It is believed that increasing the spread between the melting points of the inner and outer layer materials increases the tolerance available in manufacturing procedures. That is, the greater the melting point spread, the greater the permissible variance in RF field intensity and time applied.

In pouches made in accordance with this invention, the outer layers will remain intact during the application of bursting pressure, such as by squeezing of the pouch adjacent to the burstable seal, while the fused inner layers along the RF-sealed edge will fracture across their thickness direction from the inside edge of the burstable seal to its outside edge approximately along a plane substantially parallel to the film surface. The breakage which occurs across the seal during bursting is within the inner layers.

The method of this invention has provided surprising high consistency in burstable seals.

OBJECTS OF THE INVENTION

It is an object of this invention to provide an improved method for forming a closed burstable pouch having an improved breakable seal along an edge.

Another object of this invention is to provide a burstable pouch having a breakable seal the strength and bursting qualities of which are highly consistent from pouch to pouch.

Another object of this invention is to provide a method for forming closed burstable pouches having breakable seals which can be practiced with wide manufacturing tolerances.

These and other important objects of the invention will be apparent from the following description of preferred embodiments of the invention and from the accompanying drawings wherein:

DETAILED DESCRIPTION OF PREFERRED EMBODIMENTS

Figure 1:
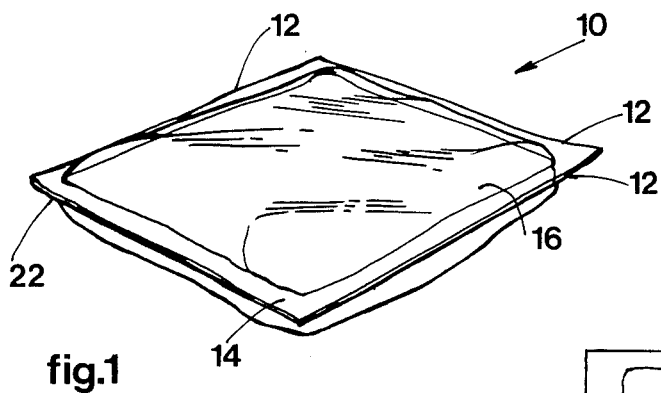
FIG. 1 is perspective view of a burstable pouch formed in accordance with this invention.
Figure 2:
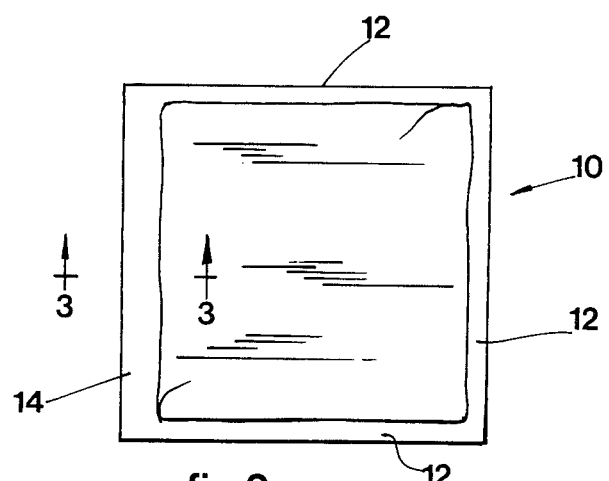
FIG. 2 is a top plan view.

FIGS. 1-4 illustrate a single burstable pouch 10 made in accordance with this invention. Pouch 10 has four edges, there of which, designated by numeral 12, have permanent seals therealong and the fourth of which has a breakable seal 14.

As previously discussed, pouch 10 is formed from two laminated polymeric film sheets 16. Laminated sheets 16 include inner layers 18 and outer layers 10. Laminated sheets 16 are formed by well-known laminating methods forming no part of this invention. Depending on the materials selected, a thin tie layer of some bonding agent may be used between inner and outer layers 18 and 20. Additional layers may also be included in the laminated film used for sheets 16.

Outer layer 20 of the laminated film is responsive to an RF welding field. Examples of suitable film materials for outer layer 20 include nylon, polyvinyl chlorides, styrene acrylonitriles, sulfone polymers, polycarbonates, nitrile polymers, and acrylonitrile butadiene polymers. Material for outer layer 20 has a melting point higher than the melting point of the material selected for inner layer 18. Outer layer 20 has a cohesive strength greater than the cohesive strength of the remainder of the laminated film in order to resist bursting pressures which will be applied to burst the pouches formed with such laminated material.

Inner layer 18 of the laminated film is a biaxially-oriented non-polar material which is substantially non-responsive to an RF welding field and which has a melting point below the melting point of the outer layer 20 with which it is laminated. The biaxial orientation of the inner layer film makes the cohesive strength of inner layer 18 in its thickness direction much lower than the cohesive strength of outer layer 20. These cohesive strength characteristics will provide the desired bursting qualities after sealing in accordance with this invention.

A highly preferred example of a material useful for inner layer 18 is biaxially-oriented polypropylene. Other useful inner layer materials, are biaxially-oriented ethylene methyl acrylate, polyvinyl alcohol, ethylene vinyl acetate, and vinylidene chlorides. Such materials are substantially non-excitable by application of an RF field.

The thickness of outer layer 20 can vary significantly. It is preferred, however, that outer layer 20 be thin, preferably less than about 100 microns in thickness. Inner layer 18 is also preferably thin, often thinner than outer layer 20. A preferred inner layer thickness is less than about 40 microns.

In selecting laminated films for use in the method of this invention, other considerations must be taken into account as well. Resistance to permeation by the intended contents and the nature and extent of possible abuse during storage are just two factors which must be considered.

A highly preferred laminated film for use in this invention is a film which is custom-laminated by Milprint, of Milwaukee, Wisconsin. This film includes a film-grade Nylon outer layer which is about 60 microns thick and a biaxially-oriented polypropylene inner layer which is about 25 microns thick connected to the outer layer by a thin adhesive layer. The melting point of the outer layer is more than 30 degrees C. above the melting point of the inner layer.

In making burstable pouch 10, two sheets of such laminated film are oriented in overlying relationship with their inner layers 18 in contact and their edges aligned. Thereafter, permanent seals are made along edges 12, by using well-known techniques such as heat sealing by constant-temperature heat bars, impulse heating, or ultrasonic welding.

Figure 4:
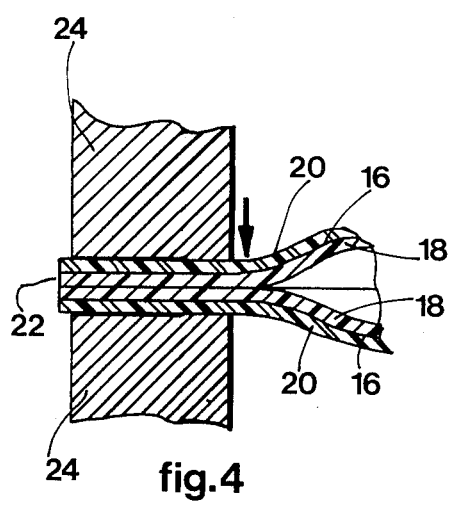
FIG. 4 is a similar sectional view showing the formation of the breakable seal.
Figure 3:
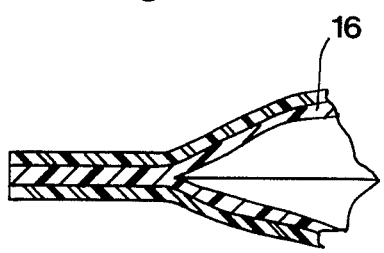
FIG. 3 is a fragmentary sectional view, taken along Section 3—3 as shown in FIG. 2.

Either before or after formation of such permanent seals, the breakable seal is made along a first edge 22 by sandwiching the laminated sheets 16 along first edge 22 between RF welding electrodes 24 and by applying a RF welding field. The RF welding field is applied for a time and at an intensity to heat outer layers 20 sufficiently to fuse inner layers 18 by transfer of heat from outer layers 20 without melting outer layers 20. FIG. 4 illustrates the beginning of this operation. FIG. 3 illustrates the breakable seal after completion of this operation, showing that inner layers 18 have fused completely while preserving the vertical structure of the fused inner layers 18 and while preserving the separate integrity of outer layers 20. Before formation of the last of the four edge seals, pouch 10 is filled using known techniques.

Fused inner layers 18 have a thickness of about 40–50 microns, indicating that there has been little or no collapse of their vertical structure, which before RF welding had a combined thickness of 50 microns. In contrast, the permanently fused inner layers of the other edges have a combined thickness of about 25 microns, indicating destruction of the vertical structure and loss of the relative weakness in the thickness direction.

Another suitable laminate has a 50-micron polyvinyl chloride outer layer and a 25-mircon biaxially-oriented vinylidene chloride inner layer. The polyvinyl chloride outer layer is formulated to have a higher melting point than the vinylidene chloride inner layer. Another acceptable laminated film has an 80-micron poly (ethylene terphthalate) outer layer, such as those available from Eastman Chemcial under the trademark Kodar, together with a 25-micron biaxially-oriented polyvinyl alcohol inner layer. Yet another acceptable laminate has a 60-micron acrylonitrile copolymer outer layer, such as Barex, which is available from Sohio, of Cleveland, Ohio, together with a 25-micron biaxially-oriented ethylene vinyl acetate inner layer.

In each case, a thin adhesive tie layer is used between the inner and outer layers. A wide variety of other film combinations can be used in making laminates acceptable for the method of this invention.

Figure 5:
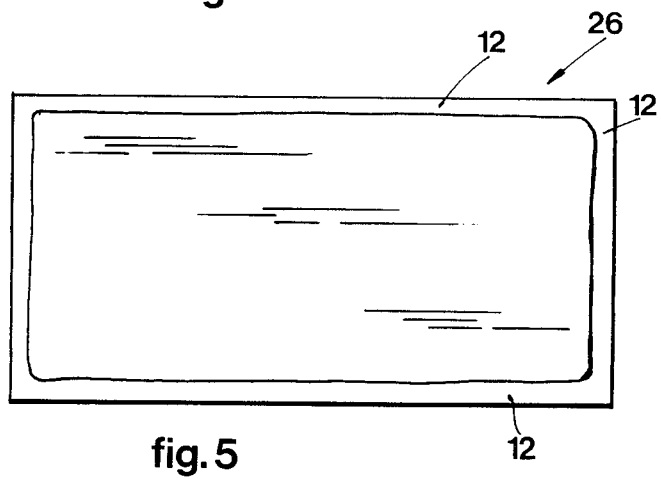
FIG. 5 is a plan view of an intermediate pouch used to make two pouches requiring formation of just one breakable seal.
Figure 6:
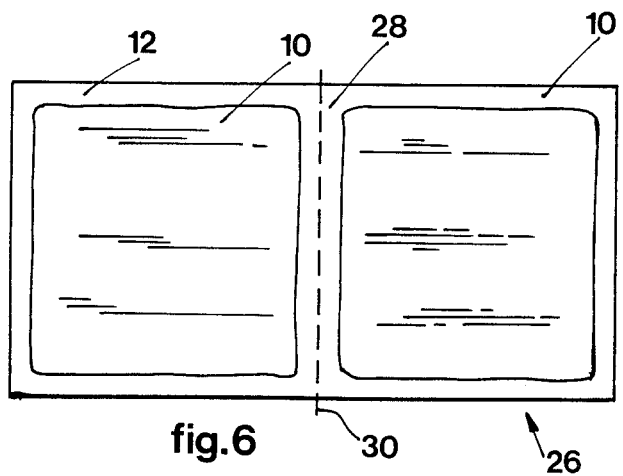
FIG. 6 is a plan view of the intermediate pouch of FIG. 5 after a breakable seal has been made thereacross and prior to separation of such intermediate pouch into two burstable pouches.

FIGS. 5 and 6 illustrate a double-sized intermediate pouch 26 which is used to simultaneously form two burstable pouches 10. The formation of intermediate pouch 26 is carried out in essentially the same manner as is the formation of single pouch 10, except that permanent seals are made on all four sides of intermediate pouch 26. The filing of intermediate pouch 26 takes place prior to completion of the last of such permanent seals. Thereafter, a breakable seal 28 is formed across the middle of intermediate pouch 26, dividing and separating the contents of intermediate pouch 26. Such breakable seal is formed by application of an RF field in the same manner as previously described. After formation of burstable seal 28, intermediate pouch 26 is cut in half along a line 30 through the middle of breakable seal 28. This method allows the formation of burstable pouches having a high liquid content, which facilitates bursting.

In some cases, layers other than those specifically described in the preferred embodiments may be included in the laminates used in this invention. For example, a combination of "outer layers" may in some cases be desirable to provide necessary chemical barriers to the contents of the pouch.

While in the foregoing specification this invention has been described in relation to certain preferred embodiments and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for forming a closed burstable pouch having a breakable seal at a first edge comprising:
    selecting laminated polymeric film having an outer layer of material responsive to a radio-frequency welding field and an inner layer of material substantially non-responsive to a radio-frequency welding field, said outer layer material having a higher melting point than the inner layer material, and said inner layer having cohesive strength in its thickness direction less than the cohesive strength of the outer layer to aid in controlled bursting of the pouch;
    placing two sheets of said film in overlying relationship with their inner layers in contact and their edges aligned;
    permanently fusing together said sheets along their aligned edges, except along said first edge;
    either before or after said fusing step, sealing said first edge by sandwiching the sheets along said first edge between radio-frequency welding electrodes and applying a radio-frequency field therebetween for a time and at an intensity to heat said outer layers sufficiently to fuse said inner layers by heat transfer from said outer layers without melting said outer layers and without destroying the relative weakness of the inner layer material in its thickness direction; and
    before completing the last of said fusing and sealing steps, filling said pouch.

2. The method of claim 1 wherein the inner layer cohesive strength in its thickness direction is less than the inner layer cohesive strength in directions parallel to the surface of the inner layer.

3. The method of claim 1 wherein the inner layer is a biaxially-oriented polymeric film.

4. The method of claim 2 wherein the inner layer is a biaxially-oriented polymeric film.

5. The method of claim 4 wherein the fused inner layers along said first edge have a total thickness which is substantially greater than the total thickness of the permanently fused inner layers along the other aligned edges, whereby the relatively lower inner-layer cohesive strength in the thickness direction is preserved in the fused inner layers along said first edge to provide consistent bursting qualities.

6. The method of claim 1 wherein the difference between the melting points of the inner and outer layers is at least about 30 degrees C.

7. The method of claim 5 wherein the difference between the melting points of the inner and outer layers is at least about 30 degrees C.

* * * * *